April 30, 1940.   L. C. FRANK   2,199,089
FRAME STRUCTURE
Filed Aug. 14, 1937   2 Sheets-Sheet 1
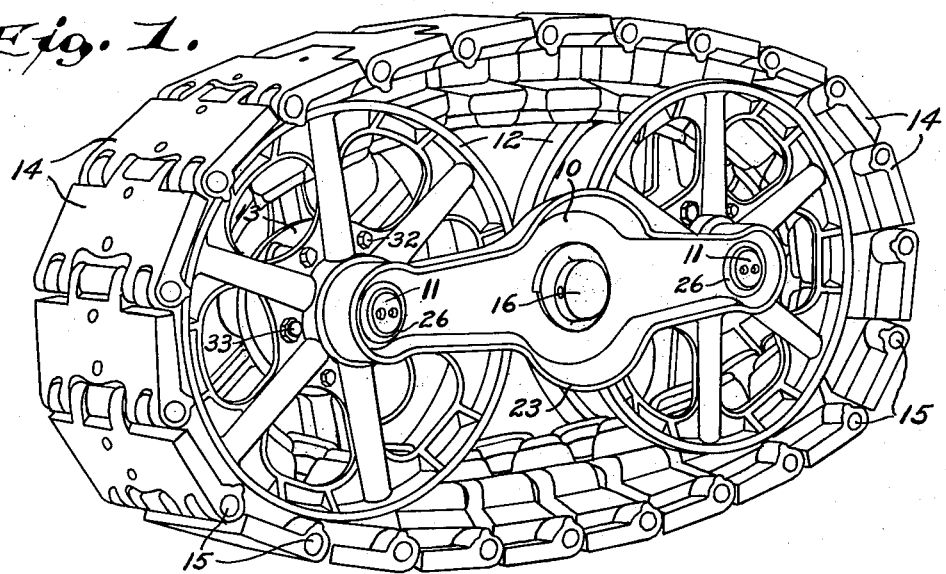

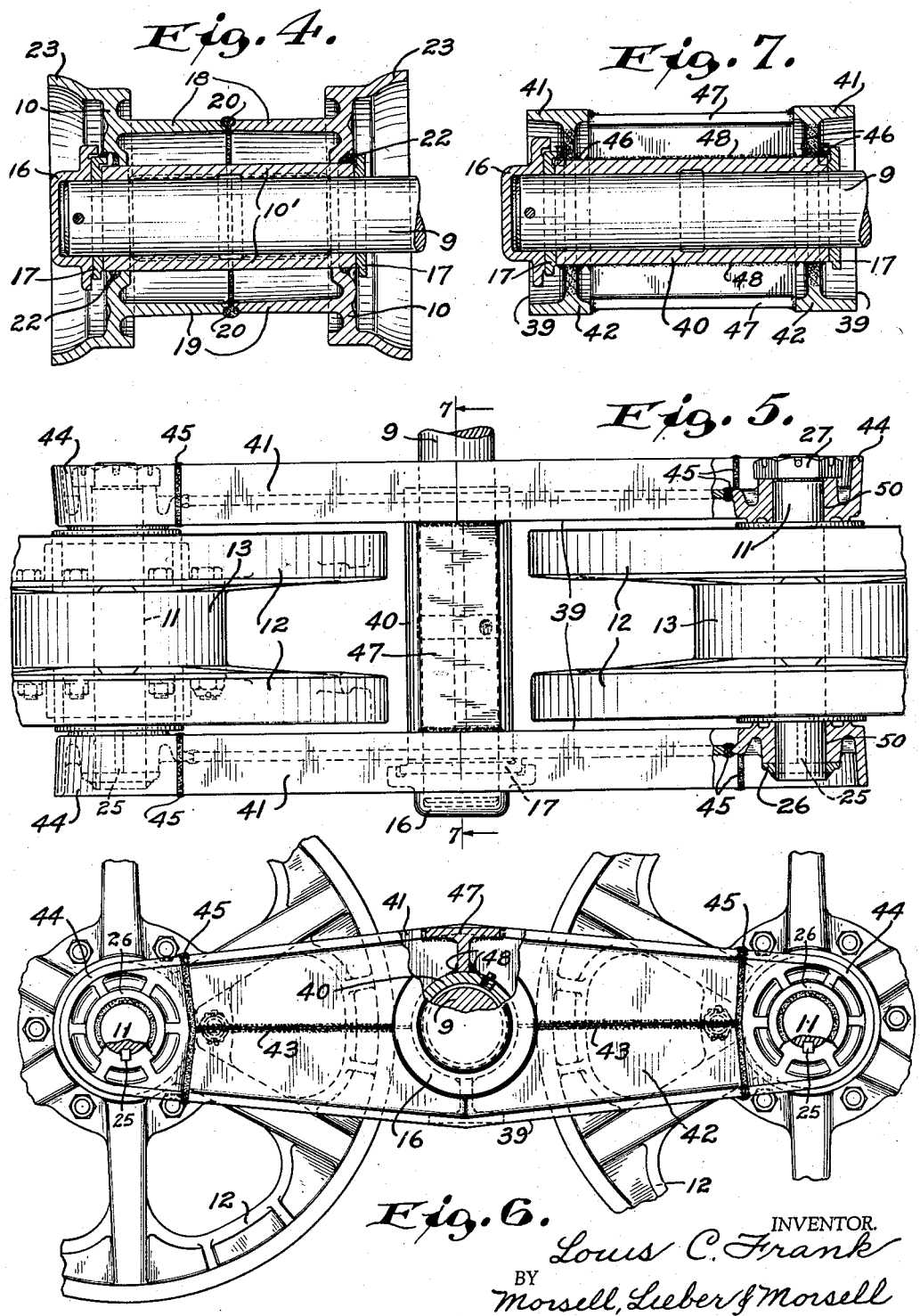

Patented Apr. 30, 1940

2,199,089

UNITED STATES PATENT OFFICE 2,199,089

FRAME STRUCTURE

Louis C. Frank, Milwaukee, Wis., assignor to Trackson Company, Milwaukee, Wis., a corporation of Wisconsin Application August 14, 1937, Serial No. 159,078

3 Claims. (Cl. 305—9)

My present invention relates generally to improvements in vehicular supporting structures, and relates more specifically to various improvements in the construction of the wheel supporting frames for tandem wheel or endless track transporting units.

Generally defined, an object of my present invention is to provide an improved frame structure for tandem wheel or endless track units, which is simple yet durable in construction and highly effective in use.

Many different types of endless track or crawler assemblages have heretofore been proposed and used for various kinds of heavy duty service such as log hauling, levee construction, and road grading. Because of the severe service and abuse to which these assemblages are subjected during normal use, the supporting frames for the tandem wheels with which the endless tracks coact, must be made extremely strong and durable in order to withstand excessive strain and shock without throwing the wheel and frame supporting axles out of alignment. The frames of these crawler units are ordinarily pivotally suspended at their mid-portions upon a main axle and the track supporting wheels are journalled in the frames forwardly and rearwardly of the central axis, and when a self-sustaining endless track assemblage is employed, the frame of the unit must be exceptionally stiff and durable in order that it will resist distortion due to various types of stresses and strains, and especially those which tend to throw the spaced side beams out of alignment with each other. While H-frames have heretofore been utilized and found satisfactory in resisting such distortion, these prior frame structures were not sufficiently rigidly interconnected at the ends of the side beams to effectively resist distortion, and moreover did not permit convenient assembly and dismantling of the mechanisms.

It is therefore a more specific object of my present invention to provide an improved H-frame construction for crawler assemblages, and especially for self-sustaining endless track mechanisms, which is compact and may be conveniently manufactured.

Another specific object of my invention is the provision of a durable frame structure which may be readily constructed of several parts some portions of which are rigidly and permanently interconnected by welding, and other portions of which may be detachably but firmly interconnected so as to produce a strong and durable final assemblage.

A further specific object of the invention is to provide an improved frame especially adapted for use in supporting endless track mechanisms, which will enable convenient and rapid assembly and dismantling of such mechanisms, and which may be manufactured at moderate cost.

These and other specific objects of my invention will be apparent from the following detailed description.

A clear conception of embodiments of the various features of this invention and of the mode of constructing and of utilizing several types of crawler frames built in accordance with my improvement, may be had by referring to the drawings accompanying and forming a part of this specification wherein like reference characters designate the same or similar parts in the various views.

Fig. 1 is a perspective view of an endless track assemblage having one type of my improved frame structure incorporated therein;

Fig. 2 is a part sectional and fragmentary top view of the frame and tandem wheels of the assemblage shown in Fig. 1;

Fig. 3 is a vertical longitudinal section through the mechanism of Fig. 2, taken along the irregular line 3—3;

Fig. 4 is a vertical transverse section through the frame of Fig. 2, taken along the line 4—4;

Fig. 5 is a part sectional and fragmentary top view of a slightly modified type of frame and tandem wheel assemblage;

Fig. 6 is a part sectional side elevation of the assemblage shown in Fig. 5; and Fig. 7 is a transverse vertical section through the frame of the assemblage illustrated in Fig. 5, the section being taken along the line 7—7.

Although I have shown and described my present invention as being especially adapted for use in conjunction with self-sustaining crawler assemblages wherein the supporting wheels are not positively driven, it is not my intent to thereby unnecessarily restrict the scope and range of use of the improvement, since some of the novel features are obviously more generally applicable.

Referring to Figs. 1 to 4 inclusive, the endless track assemblage shown therein comprises in general a main horizontal central axle 9; an H-frame comprising similar oppositely disposed elongated side frames 10 medially attached to a central sleeve 10' oscillatably coacting with the axle 9; sub-axles or bolts 11 firmly interconnecting the corresponding opposite ends of the side frames 10 and being disposed parallel to the

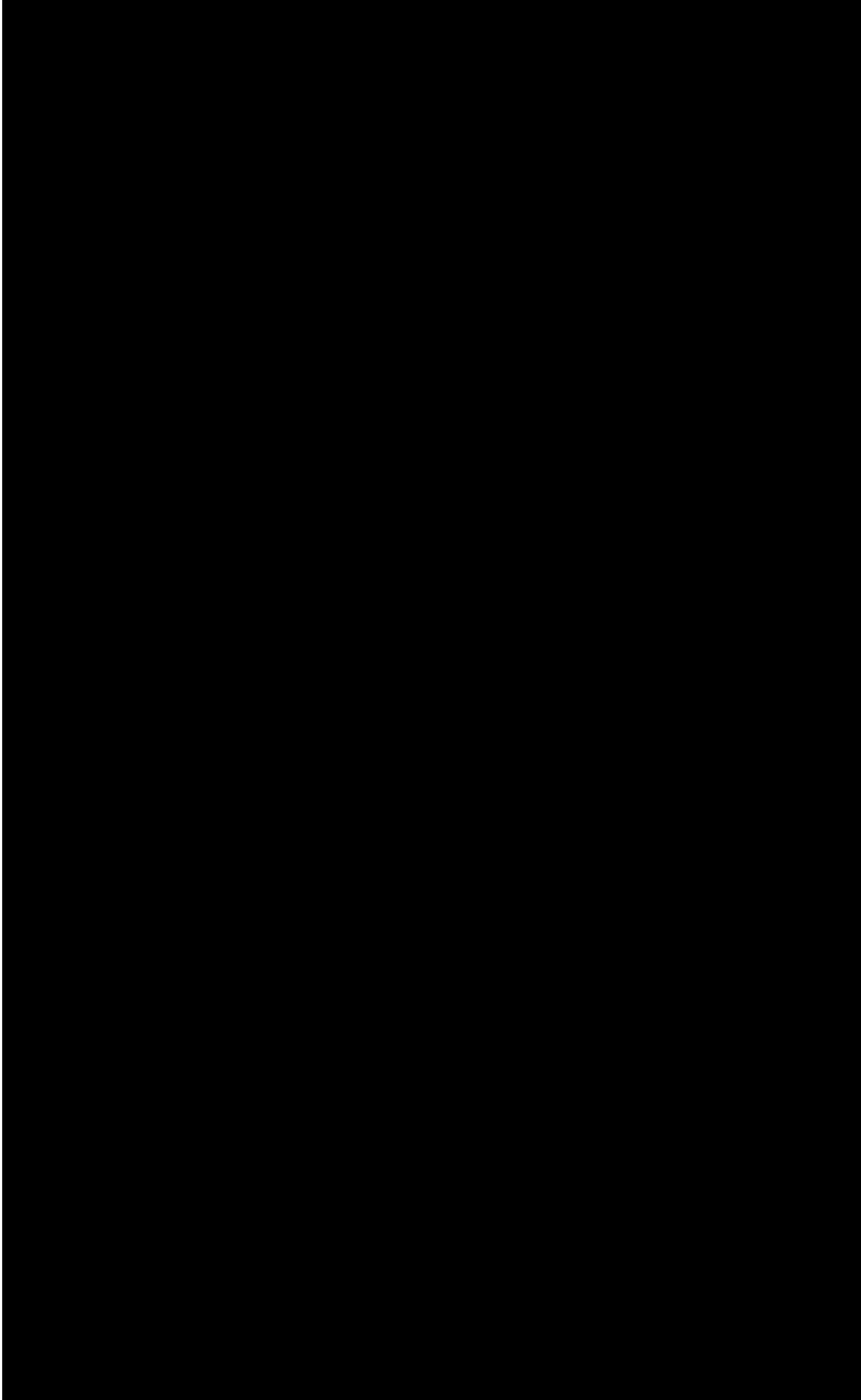

may be formed of similar upper and lower elongated metal T-section bars 41, 42 respectively which are interconnected by welds 43, and end sub-axle supporting sections 44 secured to the adjacent ends of the T-bars 41, 42 by means of welds 45. The central portions of the T-bars 41, 42 are firmly attached to the adjacent ends of the sleeve 40 by annular welds 46, and by other welds extending upwardly and downwardly at the centers of the bars 41, and the side frames 39 are additionally interconnected at their mid-portions by T-beams 47, the ends of which are welded to the side frames and the edges of which are attached by welds 48 directly to the sleeve 40. The corresponding sections 44 are provided with aligned bores 50 for the reception of the axle bolts 11, and the construction of these bolts and of the tandem wheels is the same as hereinbefore described. The modified assemblage functions in a manner similar to that of Figs. 1 to 4 inclusive, and it will be apparent that the improved modified H-frame will likewise effectively resist distortion and will maintain the three axle pivots in perfect parallelism under severest strains.

From the foregoing detailed description, it will be apparent that my present invention provides an extremely simple, compact and durable frame structure for rotatably supporting a set of tandem wheels, which may be readily manufactured and which will effectively resist distortion. The improved H-frame construction having the side frames rigidly attached to the central sleeve, and additionally rigidly interconnected by other elements which cooperate with the sleeve to resist tortional strains, will maintain the several axle pivots in absolute parallelism even under the severest conditions of operation. The mounting of the axle bolts 11 in bored openings at the ends of the side frames, obviously additionally stiffens the entire structure while permitting convenient application or removal of the wheels to the frame. The outwardly projecting parallel flanges on the side frames besides additionally stiffening and strengthening these frames, also provides protection for the bolt heads, nuts and caps which may be confined within the recesses formed by these flanges. The improved frame assemblage can be readily produced and the several parts thereof may be conveniently and durably united by welding, and the structure has proven highly satisfactory in actual commercial use under the severest conditions of operation.

While the rigid construction of the H-frame comprising the side beams and the central sleeve connecting these beams, is important, relatively rigid H-frames have heretofore been employed in assemblages of this general type. Due to the relatively great length of the side beams and the extreme pressures to which the ends thereof are subjected, the side beams of these prior structures tended to deflect and would thus throw the wheels and the wheel supports out of parallelism. The mounting of the end bolts 11 with their end portions in snug engagement with relatively long and accurately alined bores in the ends of the side beams of the H-frame, is therefore of considerable importance in stiffening the frames at their opposite end portions; and the endwise removability of the wheel supports enables each wheel and its bearings to be handled as a complete unit during application and removal of the wheels. This interconnection at the ends of the side beams, may be advantageously used regardless of the type of connection utilized at the medial portions of the side frames, and it will be obvious that the midportions of the side frames may be connected by a sleeve or shaft alone and the auxiliary connectors may be omitted. The coaction of the end bolts 11 with the frame ends and with the alined inner bearing races 30 and intermediate sleeves 29 so as to clamp these parts in place, is also important because this clamping action also definitely spaces the adjacent ends of the side beams and thus additionally enhances the frame stiffness and insures proper relative positioning of the wheels.

It should be understood that it is not desired to limit this invention to the exact details of construction or to the precise mode of use herein shown and described, for various modifications within the scope of the claims may occur to persons skilled in the art.

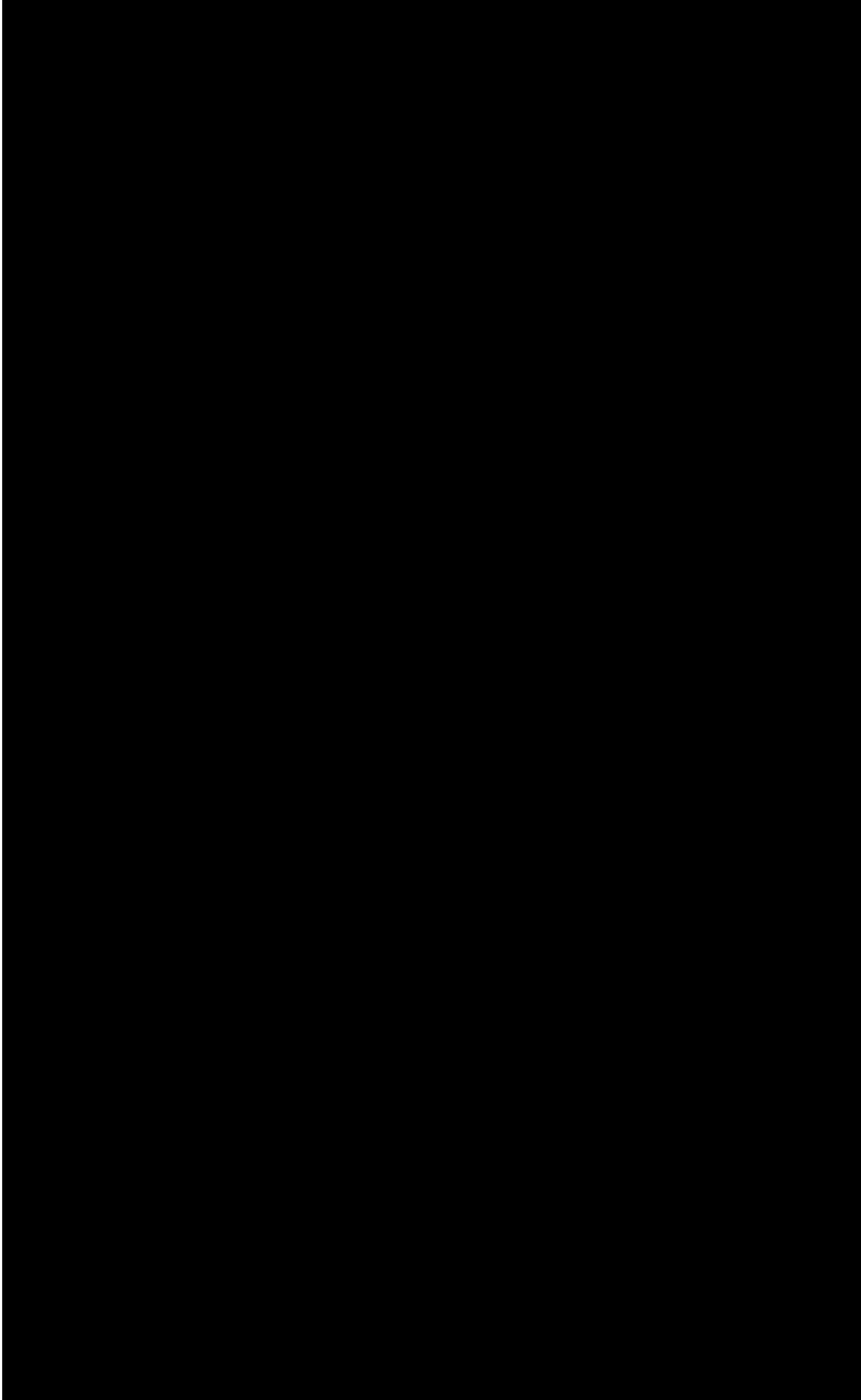

I claim:

1. In combination, a pair of laterally spaced elongated side frames permanently and rigidly interconnected between their ends by a journal sleeve, said frames having relatively long alined transverse bores at their corresponding ends disposed parallel to the axis of said sleeve, a pivot axle coacting with said sleeve and supporting said frames, a bolt snugly engaging each alined set of said end bores, each of said bolts having clamping means at its opposite ends coacting with outer surfaces of the adjacent frame ends, bearing races embracing each bolt directly adjacent the inner face of each of the adjacent frame ends, a bushing embracing the medial portion of each bolt between the bearing races thereon, said races and bushing of each set forming a continuous hollow strut and being clamped by the corresponding bolt and clamping means between the adjacent frame ends, and a wheel embracing each set of said races and bushing and being journalled for rotation on the corresponding bearing races.

2. In combination, a pair of laterally spaced elongated side frames permanently and rigidly interconnected between their ends by a journal sleeve, said frames having relatively long alined transverse bores at their corresponding ends disposed parallel to the axis of said sleeve, a pivot axle coacting with said sleeve and supporting said frames, a bolt snugly engaging each alined set of said end bores, each of said bolts having clamping means at its opposite ends coacting with outer surfaces of the adjacent frame ends, bearing races embracing each bolt directly adjacent the inner face of each of the adjacent frame ends, a bushing embracing the medial portion of each bolt between the bearing races thereon, said races and bushing of each set forming a continuous hollow strut and being clamped by the corresponding bolt and clamping means between the adjacent frame ends, a wheel embracing each set of said races and bushing, each wheel having spaced outer bearing races surrounding the bolt embracing races therein, and anti-friction bearing elements interposed between the corresponding outer and inner races.

3. In combination, a pair of laterally spaced elongated side frames rigidly interconnected between their ends by a journal sleeve and by integral re-enforcing projections adjoining and permanently secured to said sleeve and to each other, said frames having relatively long alined transverse bores at their corresponding ends disposed parallel to the axis of said sleeve, a